United States Patent
Thorne

(10) Patent No.: US 11,897,374 B2
(45) Date of Patent: Feb. 13, 2024

(54) ROTATING RIGID LATCH ATTACHMENTS FOR A CAR SEAT BASE

(71) Applicant: Safest Seats LLC, Sewickley, PA (US)

(72) Inventor: Henry F. Thorne, Sewickley, PA (US)

(73) Assignee: Safest Seats LLC, Sewickley, PA (US)

( * ) Notice: Subject to any disclaimer, the term of this patent is extended or adjusted under 35 U.S.C. 154(b) by 341 days.

(21) Appl. No.: 17/058,994

(22) PCT Filed: Jun. 3, 2019

(86) PCT No.: PCT/US2019/035163
§ 371 (c)(1),
(2) Date: Nov. 25, 2020

(87) PCT Pub. No.: WO2019/236460
PCT Pub. Date: Dec. 12, 2019

(65) Prior Publication Data
US 2021/0229577 A1    Jul. 29, 2021

Related U.S. Application Data

(60) Provisional application No. 62/680,252, filed on Jun. 4, 2018.

(51) Int. Cl.
*B60N 2/28* (2006.01)
*B60N 2/90* (2018.01)

(52) U.S. Cl.
CPC ........... *B60N 2/2821* (2013.01); *B60N 2/286* (2013.01); *B60N 2/2806* (2013.01); *B60N 2/289* (2013.01);
(Continued)

(58) Field of Classification Search
CPC .... B60N 2/2821; B60N 2/2827; B60N 2/286; B60N 2/2884; B60N 2/289; B60N 2/2824
See application file for complete search history.

(56) References Cited

U.S. PATENT DOCUMENTS

| 360,764 A | * | 4/1887 | De Voe | A61G 7/16 297/423.35 |
| 4,186,961 A | | 2/1980 | Farrell, Jr. et al. | |

(Continued)

FOREIGN PATENT DOCUMENTS

| CN | 202911586 U | * | 5/2013 |
| CN | 202911586 U | | 5/2013 |
| EP | 0970842 B1 | | 9/2004 |

OTHER PUBLICATIONS

International Search Report and Written Opinion issued in corresponding International Patent Application No. PCT/US2019/35163.

*Primary Examiner* — Syed A Islam
(74) *Attorney, Agent, or Firm* — The Webb Law Firm

(57) ABSTRACT

A base for a child car seat includes a seat base body configured to support a child carrier. The seat base body has a belt channel configured to receive a vehicle seat belt to retain the seat bas body against a vehicle seat. The base for a child car seat further includes a latch connector arm having a proximal end pivotally connected to the seat base body and a distal end configured to attach to a rigid anchor of the vehicle seat. The latch connector is rotatable between a stowed position and an attachment position. In the stowed position, the latch connector arm is located such that the vehicle seat belt may extend through the belt channel and connect to a buckle of the vehicle seat without contacting the latch connector arm.

18 Claims, 8 Drawing Sheets

(52) U.S. Cl.
CPC .......... *B60N 2/2824* (2013.01); *B60N 2/2827* (2013.01); *B60N 2/2884* (2013.01); *B60N 2002/2815* (2013.01); *B60N 2002/957* (2018.02)

(56) References Cited

U.S. PATENT DOCUMENTS

| | | | |
|---|---|---|---|
| 8,366,192 B2 | 2/2013 | Clement et al. | |
| 9,016,781 B2 | 4/2015 | Cheng et al. | |
| 9,102,249 B2 * | 8/2015 | Mo ........................ | B60N 2/28 |
| 9,403,450 B2 | 8/2016 | Cheng et al. | |
| 10,189,381 B2 * | 1/2019 | Williams .............. | B60N 2/2806 |
| 10,723,245 B2 * | 7/2020 | Anderson ............ | B60N 2/2821 |
| 2002/0038968 A1 * | 4/2002 | Maier .................. | B60N 2/2893 |
| | | | 297/253 |
| 2008/0303321 A1 * | 12/2008 | Powell ................. | B60N 2/2845 |
| | | | 297/216.11 |
| 2010/0032997 A1 * | 2/2010 | Gold .................... | B60N 2/2893 |
| | | | 248/542 |
| 2010/0237672 A1 | 9/2010 | Hutchinson et al. | |
| 2011/0285183 A1 | 11/2011 | Poniatowski et al. | |
| 2016/0332542 A1 * | 11/2016 | Cohen .................. | B60N 2/2884 |
| 2018/0001832 A1 | 1/2018 | Nickel et al. | |

\* cited by examiner

ROTATING RIGID LATCH ATTACHMENTS FOR A CAR SEAT BASE

CROSS REFERENCE TO RELATED APPLICATIONS

This application is the U.S. national phase of International Application No. PCT/US2019/035163 filed on Jun. 3, 2019, and claims benefit of U.S. Provisional Application No. 62/680,252 filed Jun. 4, 2018, the disclosures of which are hereby incorporated by reference in their entirety.

BACKGROUND OF THE INVENTION

Field of the Invention

The present invention is generally directed to a child car seat base and child restraint system (CRS) base for use in an automobile and, more particularly, to a child car seat base including rotating rigid latch attachments.

Description of Related Art

Numerous industry and government guidance documents and standards recommend proper constraints for CRS installation. Aside from CRS manufacturer datasheets, pertinent information regarding standards and guidance can be found in three National Highway Traffic Safety Administration (NHTSA) reports, entitled, "Driver mistakes when installing child seats", "Misuse of Child Restraints", and "Child Restraint Use Survey: LATCH Use and Misuse". Also, FMVSS213 and 225 standards include testing and crashworthiness requirements for a CRS.

Modern child restraint systems can be connected to the vehicle by the vehicle seat belt or by the Lower Anchors and Tethers for CHildren (LATCH) system, which is integrated with the CRS via specialized connectors. When properly utilized, either the vehicle seat belt or the LATCH system satisfies current crash test requirements for a CRS or CRS base, though the two systems should almost never be used in conjunction. Many users develop a preference for using either the vehicle seat belt or the LATCH system, based on how frequently they remove and reinstall the CRS and/or the accessibility of the LATCH anchors in a specific automobile. Additionally, some vehicles lack LATCH anchors altogether or in certain seats, necessitating that the CRS be attached via the vehicle seat belt. As such, it is preferable that CRSs and CRS bases are fitted with both a belt path for use with the vehicle seat belt and LATCH connectors. In CRSs and CRS bases having both systems, the LATCH connectors must be stowed to prevent interference with the vehicle seat belt when the vehicle seat belt is used to attach the CRS or CRS base to the vehicle.

To stow the LATCH connectors out of the path of the vehicle seat belt, some existing CRSs and CRS bases utilize complex sliding assemblies. While effective to that end, such designs are cumbersome and generally expensive to manufacture and, therefore, enjoy limited commercial success. Other existing CRSs and CRS bases utilize a pivot that allows the LATCH connectors to be rotated about a horizontal axis away from the LATCH anchors of the vehicle. However, while such designs may successfully stow the LATCH connectors out of the bight of the seat, the stowed position of the LATCH connectors still impedes the path of the vehicle seat belt securing the CRS or CRS base to the vehicle. As such, under-tightening of the vehicle seat belt may occur during installation, and the vehicle seat belt may shift when driving the vehicle.

In view of these deficiencies, there exists a need for a simple but effective CRS base that permits stowing of the LATCH connectors out of the path of the vehicle seat belt.

SUMMARY OF THE INVENTION

According to an aspect of the disclosure, a base for a child car seat, includes a seat base body configured to support a child carrier. The seat base body has a belt channel configured to receive a vehicle seat belt to retain the seat bas body against a vehicle seat. The base for a child car seat further includes a latch connector arm having a proximal end pivotally connected to the seat base body and a distal end configured to attach to a rigid anchor of the vehicle seat. The latch connector is rotatable between a stowed position and an attachment position. In the stowed position, the latch connector arm is located such that the vehicle seat belt may extend through the belt channel and connect to a buckle of the vehicle seat without contacting the latch connector arm.

In some aspects of the disclosure, the seat base body includes an upper member, a lower member pivotally attached to the upper member, and a height adjustment mechanism configured to adjust the angle between the upper member and the lower member.

In some aspects of the disclosure, the base for a child car seat further includes a pin extending through the lower member. The pin is configured to abut the latch connector arm in at least one of the stowed position or the attachment position.

In some aspects of the disclosure, the height adjustment mechanism includes a toothed slot configured to engage a rod to lock the upper member to the lower member in any of a plurality of positions.

In some aspects of the disclosure, the proximal end of the latch connector arm is pivotal about an orthogonal axis extending substantially perpendicular to a major axis of the latch connector arm.

In some aspects of the disclosure, the latch connector arm is pivotal about the orthogonal axis such that the distal end of the latch connector arm rotates inwardly towards a central plane of the base.

In some aspects of the disclosure, the latch connector arm includes a first latch connector arm pivotal about a first orthogonal axis extending substantially perpendicular to a major axis of the first latch connector arm, and a second latch connector arm pivotal about a second orthogonal axis extending substantially perpendicular to a major axis of the second latch connector arm.

In some aspects of the disclosure, the proximal end of the latch connector arm is located between the seat belt channel and a back cushion of the vehicle seat.

In some aspects of the disclosure, the latch connector arm includes an L-shaped member such that the orthogonal axis is horizontally offset from the major axis of the latch connector arm.

In some aspects of the disclosure, the proximal end of the latch connector arm is pivotal about a transverse axis extending in a substantially horizontal direction.

In some aspects of the disclosure, the belt channel of the seat base body is located between the transverse axis and a back cushion of the vehicle seat.

In some aspects of the disclosure, the latch connector arm includes a first latch connector arm rigidly attached to a second latch connector arm via a shaft.

In some aspects of the disclosure, the latch connector arm defines at least one aperture, and the latch connector arm is lockable in the attachment position by a pin extending at least partially through the seat base body and one of the at least one apertures.

In some aspects of the disclosure, the latch connector arm is lockable in the stowed position by a pin extending at least partially through the seat base body and one of the at least one apertures.

In some aspects of the disclosure, the base for a child car seat further includes a leg extending from the seat base body and configured to engage a floor surface to elevate at least a portion of the seat base body above the vehicle seat.

According to another aspect of the disclosure, a base for a child car seat includes a seat base body configured to support a child carrier, the seat base body configured to be retained against a vehicle seat of a vehicle via a seat belt of the vehicle. The base for a child car seat further includes a leg extending from the seat base body and configured to engage a floor surface of the vehicle to elevate at least a portion of the seat base body above the vehicle seat, and a latch connector arm having a proximal end pivotally connected to the seat base body and a distal end configured to attach to a rigid anchor of the vehicle seat. The latch connector rotatable between a stowed position and an attachment position.

In some aspects of the disclosure, in the stowed position, the latch connector arm is located such that the vehicle seat belt may extend through the seat base body and connect to a buckle of the vehicle seat without contacting the latch connector arm.

In some aspects of the disclosure, the proximal end of the latch connector arm is pivotal about an orthogonal axis extending substantially perpendicular to a major axis of the latch connector arm.

In some aspects of the disclosure, the latch connector arm includes an L-shaped member such that the orthogonal axis is horizontally offset from the major axis of the latch connector arm.

In some aspects of the disclosure, the proximal end of the latch connector arm is pivotal about a transverse axis extending in a substantially horizontal direction.

Further aspects of the disclosure are set forth in the following numbered clauses:

Clause 1. A base for a child car seat, comprising: a seat base body configured to support a child carrier, the seat base body having a belt channel configured to receive a vehicle seat belt to retain the seat bas body against a vehicle seat; and a latch connector arm having a proximal end pivotally connected to the seat base body and a distal end configured to attach to a rigid anchor of the vehicle seat, the latch connector rotatable between a stowed position and an attachment position, wherein, in the stowed position, the latch connector arm is located such that the vehicle seat belt may extend through the belt channel and connect to a buckle of the vehicle seat without contacting the latch connector arm.

Clause 2. The base for a child car seat of clause 1, wherein the seat base body comprises: an upper member; a lower member pivotally attached to the upper member; and a height adjustment mechanism configured to adjust the angle between the upper member and the lower member.

Clause 3. The base for a child car seat of clause 1 or 2, further comprising a pin extending through the lower member, wherein the pin is configured to abut the latch connector arm in at least one of the stowed position or the attachment position.

Clause 4. The base for a child car seat of any of clauses 1 to 3, wherein the height adjustment mechanism comprises a toothed slot configured to engage a rod to lock the upper member to the lower member in any of a plurality of positions.

Clause 5. The base for a child car seat of any of clauses 1 to 4, wherein the proximal end of the latch connector arm is pivotal about an orthogonal axis extending substantially perpendicular to a major axis of the latch connector arm.

Clause 6. The base for a child car seat of any of clauses 1 to 5, wherein the latch connector arm is pivotal about the orthogonal axis such that the distal end of the latch connector arm rotates inwardly towards a central plane of the base.

Clause 7. The base for a child car seat of any of clauses 1 to 6, wherein the latch connector arm comprises: a first latch connector arm pivotal about a first orthogonal axis extending substantially perpendicular to a major axis of the first latch connector arm; and a second latch connector arm pivotal about a second orthogonal axis extending substantially perpendicular to a major axis of the second latch connector arm.

Clause 8. The base for a child car seat of any of clauses 1 to 7, wherein the proximal end of the latch connector arm is located between the seat belt channel and a back cushion of the vehicle seat.

Clause 9. The base for a child car seat of any of clauses 1 to 8, wherein the latch connector arm comprises an L-shaped member such that the orthogonal axis is horizontally offset from the major axis of the latch connector arm.

Clause 10. The base for a child car seat of any of clauses 1 to 9, wherein the proximal end of the latch connector arm is pivotal about a transverse axis extending in a substantially horizontal direction.

Clause 11. The base for a child car seat of any of clauses 1 to 10, wherein the belt channel of the seat base body is located between the transverse axis and a back cushion of the vehicle seat.

Clause 12. The base for a child car seat of any of clauses 1 to 11, wherein the latch connector arm comprises a first latch connector arm rigidly attached to a second latch connector arm via a shaft.

Clause 13. The base for a child car seat of any of clauses 1 to 12, wherein the latch connector arm defines at least one aperture, and wherein the latch connector arm is lockable in the attachment position by a pin extending at least partially through the seat base body and one of the at least one apertures.

Clause 14. The base for a child car seat of any of clauses 1 to 13, wherein the latch connector arm is lockable in the stowed position by a pin extending at least partially through the seat base body and one of the at least one apertures.

Clause 15. The base for a child car seat of any of clauses 1 to 14, further comprising a leg extending from the seat base body and configured to engage a floor surface to elevate at least a portion of the seat base body above the vehicle seat.

Clause 16. A base for a child car seat, comprising: a seat base body configured to support a child carrier, the seat base body configured to be retained against a vehicle seat of a vehicle via a seat belt of the vehicle; a leg extending from the seat base body and configured to engage a floor surface of the vehicle to elevate at least a portion of the seat base body above the vehicle seat; and a latch connector arm having a proximal end pivotally connected to the seat base body and a distal end configured to attach to a rigid anchor of the vehicle seat, the latch connector rotatable between a stowed position and an attachment position.

Clause 17. The base for a child car seat of clause 16, wherein, in the stowed position, the latch connector arm is located such that the vehicle seat belt may extend through the seat base body and connect to a buckle of the vehicle seat without contacting the latch connector arm.

Clause 18. The base for a child car seat of clause 16 or 17, wherein the proximal end of the latch connector arm is pivotal about an orthogonal axis extending substantially perpendicular to a major axis of the latch connector arm.

Clause 19. The base for a child car seat of any of clauses 16 to 18, wherein the latch connector arm comprises an L-shaped member such that the orthogonal axis is horizontally offset from the major axis of the latch connector arm.

Clause 20. The base for a child car seat of any of clauses 16 to 19, wherein the proximal end of the latch connector arm is pivotal about a transverse axis extending in a substantially horizontal direction.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

DETAILED DESCRIPTION OF THE PREFERRED EMBODIMENTS

Figure 1:
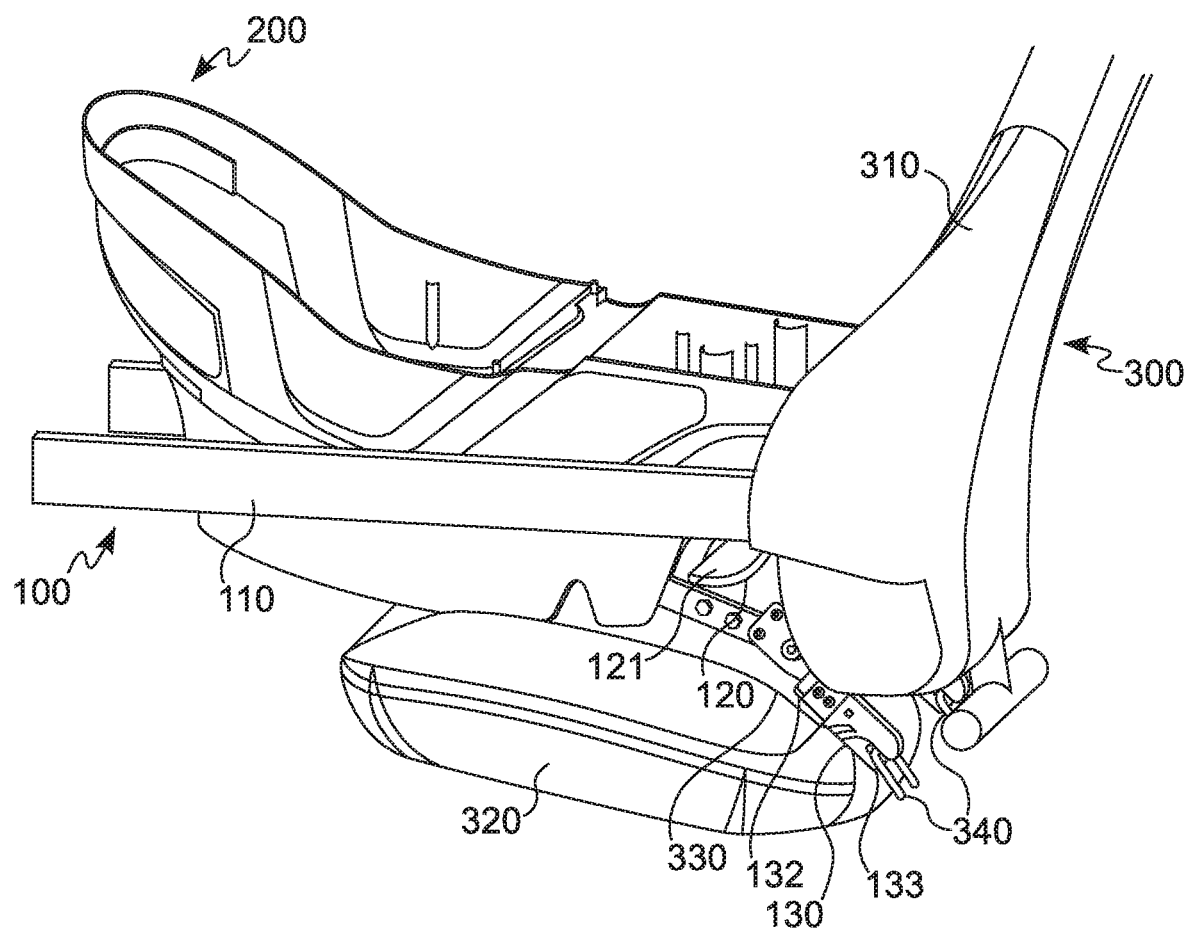
FIG. 1 is a perspective view of a child car seat base according to an aspect of the present disclosure.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the aspects disclosed herein are not to be considered as limiting.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

As used herein, the terms "substantially perpendicular to" and "substantially parallel to", when used to define an angular measurement relative to an element, mean within 20° of the perpendicular or parallel, respectively. For example, the term "substantially perpendicular to an axis" means angled between 70°-110° relative to the axis.

The terms child restraint system (CRS) and child car seat may be used interchangeably herein to refer to devices for securing infants and young children to a vehicle (e.g., automobile) seat. The CRSs or child car seats discussed herein may be, for example, infant seats, which are generally rear-facing and include a base portion separable from a child carrier portion, or convertible seats, which may be changed from rear-facing to front-facing, accordingly, as the child grows. CRSs typically include belts and/or LATCH connectors for securing the CRS directly to the vehicle seat. Aspects of the present disclosure are directed to a car seat base which may be installed between the CRS and the vehicle seat, with the car seat base being secured directly to the vehicle seat and the CRS being secured either directly or indirectly to the car seat base. That is, the CRS may be secured, via belts or latch connectors, either directly to the car seat base, or directly to the vehicle seat.

Figure 2:
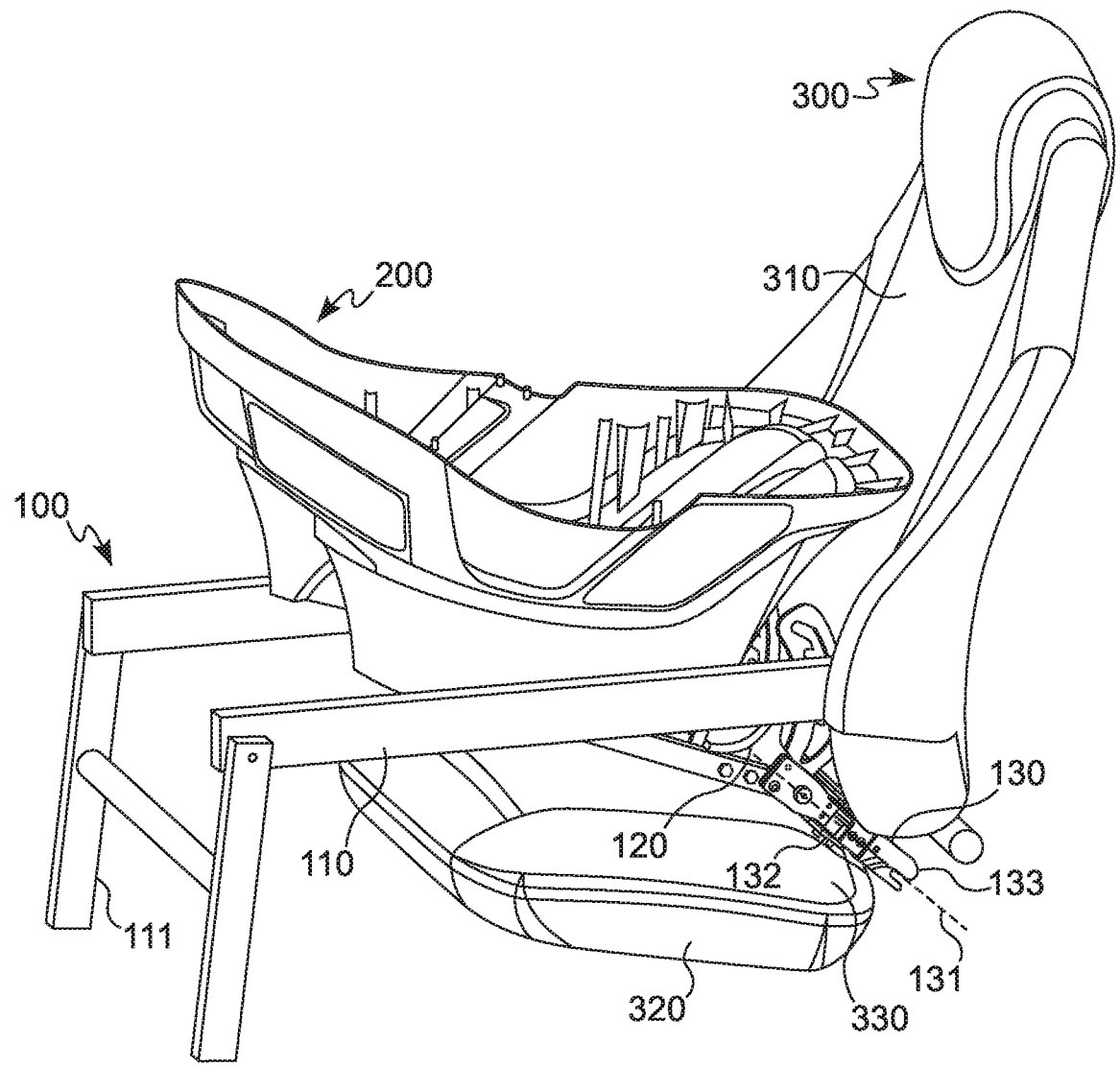
FIG. 2 is a perspective view of another child car seat base according to an aspect of the present disclosure.
Figure 3:
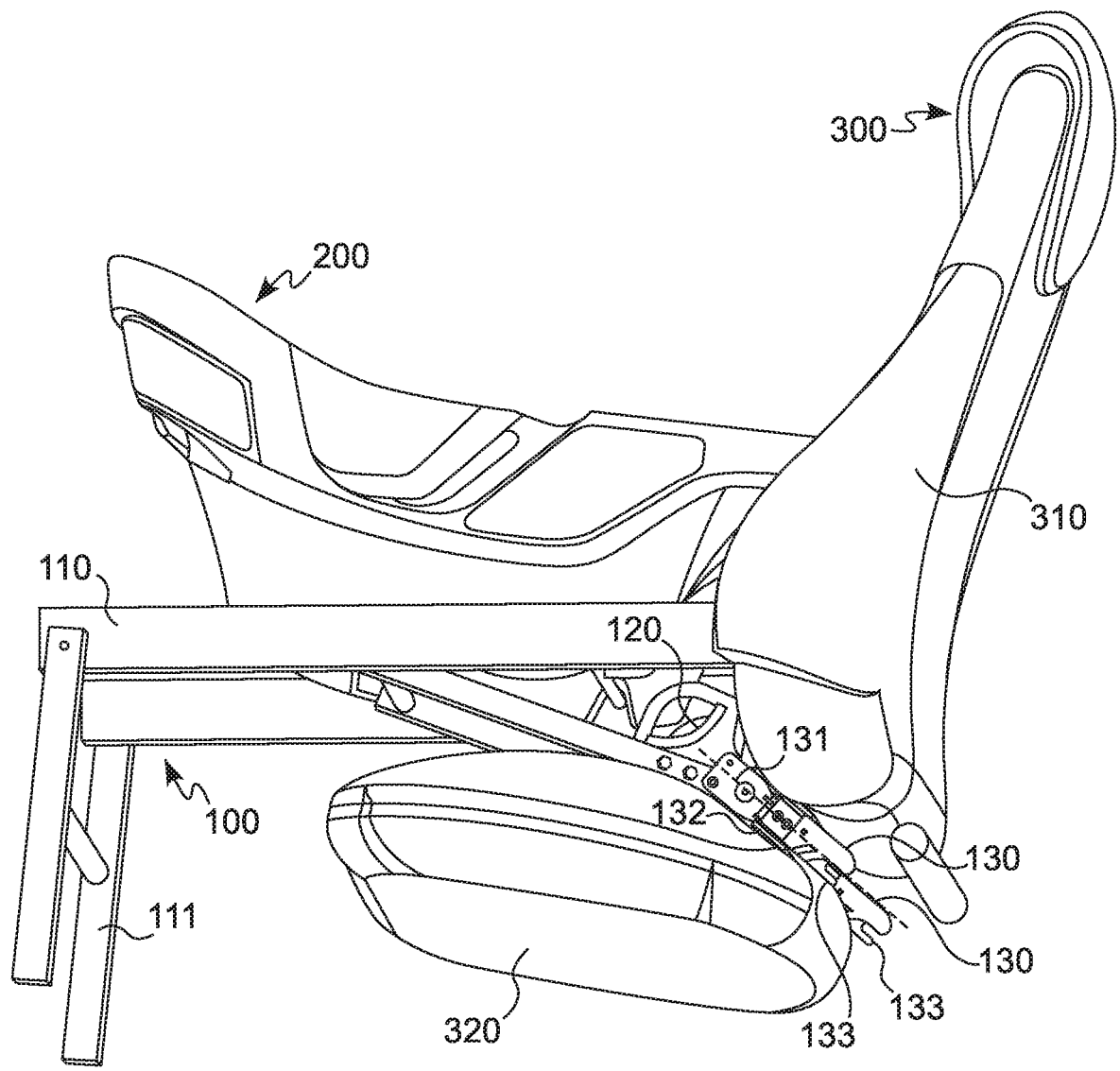
FIG. 3 is another perspective view of the child car seat base of FIG. 2.

Referring now to FIGS. 1-3, a car seat base 100 according to an aspect of the present disclosure may be utilized to secure a CRS 200 to a vehicle seat 300. The CRS 200 shown in FIGS. 1-3 is installed in a rear-facing orientation. However, the present disclosure is not limited to rear-facing CRSs, and, as will be appreciated especially from FIG. 6, forward-facing, convertible, and other orientations and designs of CRSs may be utilized with the car seat base 100. The vehicle seat 300 includes a back cushion 310 and bottom cushion 320, which meet in a seat bight 330. LATCH anchors 340 are positioned in or protruding from the bight 330 and, in some aspects, are spaced at eleven (11) inches on-center in each seat 300, according to U.S. industry regulations. Each LATCH anchor 340 is generally U-shaped and is rigidly connected to the frame and/or body of the vehicle.

The car seat base 100 includes a seat base body 110 which provides the rigid structure of the car seat base 100 and to which the CRS 200 is mounted. When installed in the vehicle seat 300, the seat base body 110 may at least partially rest on the bottom cushion 320 of the seat 300. In some aspects, as shown in FIGS. 2 and 3, the seat base body 110 may include a fixed or adjustable leg 111 which extends from an end of the seat base body 110 opposite the end of the seat base body 110 positioned adjacent to the bight 330 of the vehicle seat 300. The leg 111 engages a floor surface of the vehicle and elevates at least a portion of the seat base body 110 above the bottom cushion 320.

The seat base body 110 includes or defines a belt channel 120 extending transversely through at least a portion of the car seat base 110. The belt channel 120 is configured to receive a conventional vehicle seat belt (not shown) therethrough. The belt channel 120 is positioned such that the tension of the seat belt pulls and retains the seat base body 110 toward the bight 330 of the seat 300. In the aspects shown in the accompanying drawings, the belt channel 120 includes a concave surface 121 extending transversely through the seat base body 110 which engages the vehicle seat belt. However, in other aspects not shown, the belt channel 120 may not extend through a central portion of the seat base body, instead including apertures on opposite transverse sides of the seat base body 110 which are configured to receive the seat belt. Other designs of the belt channel 120 may be appreciated by those skilled in the art without departing from the scope of the present disclosure.

The seat base body 110 further includes one or more latch connector arms 130, each of which corresponds to one of the LATCH anchors 340 of the seat 300. Each latch connector arm 130 extends along a major axis 131 from a proximal end 132 to a distal end 133.

The proximal end 132 of each latch connector arm 130 is rotatably connected to the seat base body 110, while the distal end 133 is attachable to the corresponding LATCH anchor 340. A transverse horizontal axis H (see FIGS. 4 and 5) extends through the proximal ends 132 of both of the latch connector arms 130. The distal end 133 of each latch connector arm 130 may include a clasp, hook, or other fastening element to engage and connect to the LATCH anchor 340. For example, the distal end 133 of each latch connector arm 130 may include a set of spring-loaded jaws attachable to the LATCH anchor 340 by a user pressing the distal end 133 of the latch connector arm 130 against the LATCH anchor 340.

Figure 4:
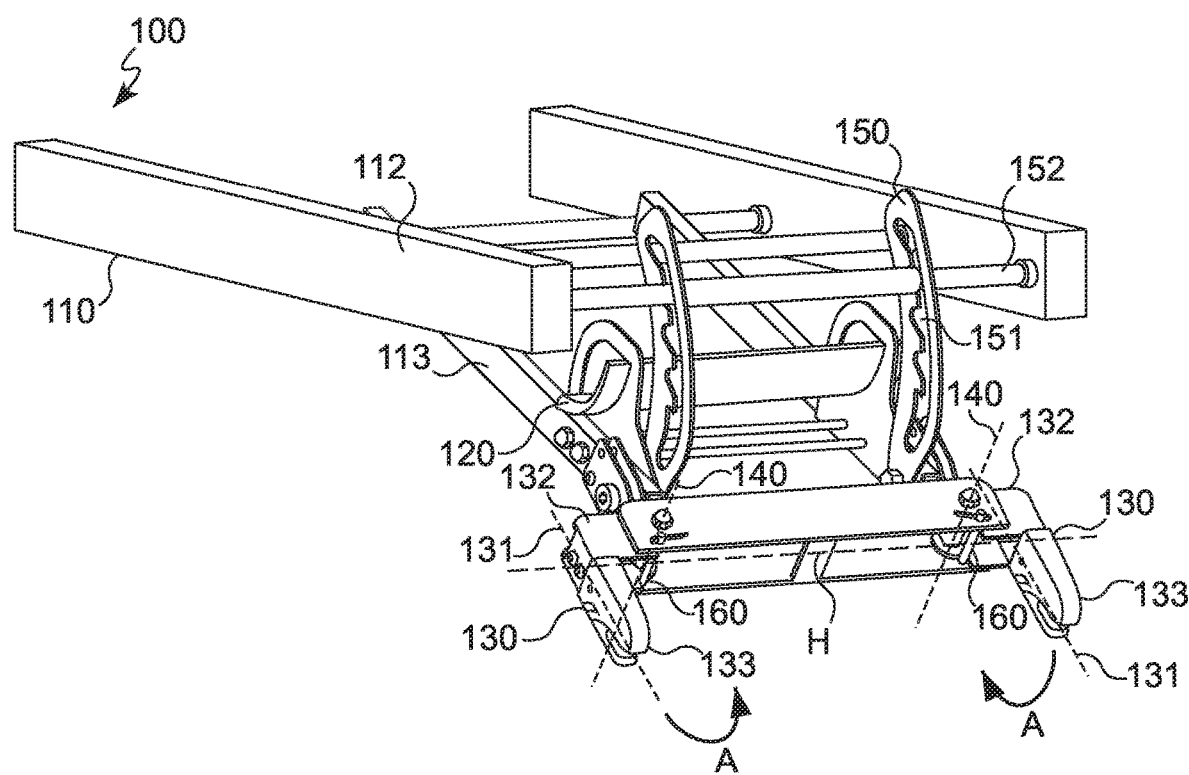
FIG. 4 is a rear perspective view of the child car seat base of FIG. 1, with latch arms in the attachment position.
Figure 5:
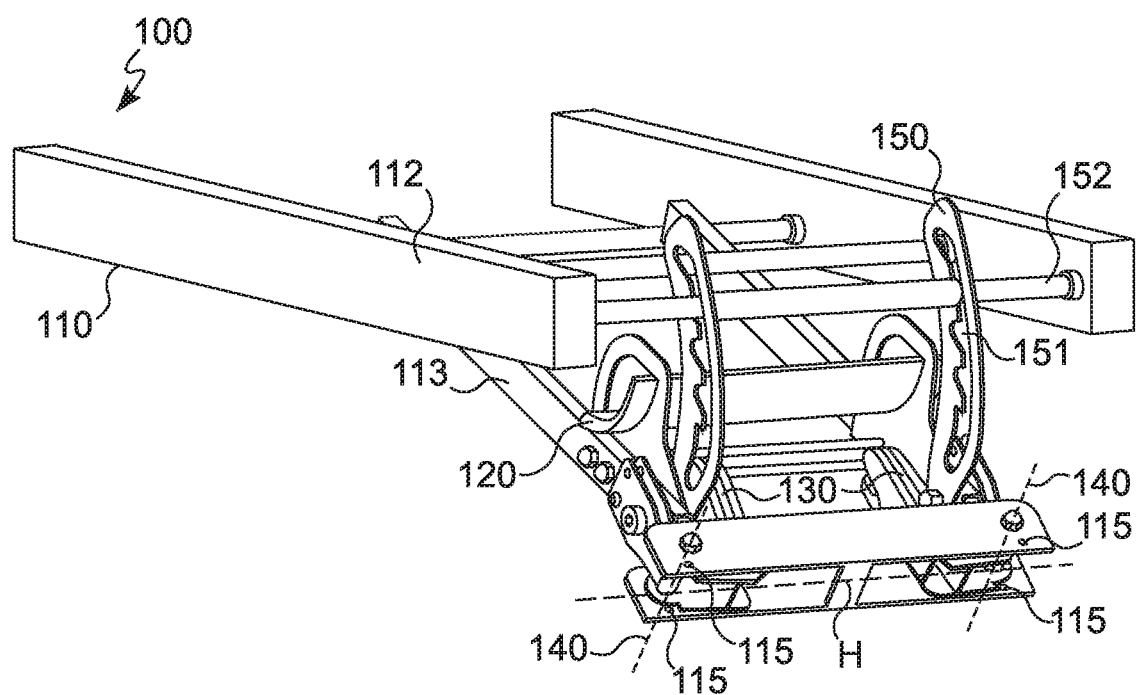
FIG. 5 is a rear perspective view of the child car seat base of FIG. 1, with the arms in the stowed position.

Referring now to FIGS. 4 and 5, the proximal end 132 of each latch connector arm 130 may be rotatably connected to the seat base body 110 about a pivot axis 140 to permit pivoting or rotation of the latch connector arms 130 relative to the seat base body 110. In particular, the latch connector arms 130 may be pivoted between an attachment position, shown in FIG. 4, and a stowed position, shown in FIG. 5. In the attachment position (FIG. 4), the latch connector arms 130 are oriented such that their distal ends 133 protrude towards the corresponding LATCH anchors 340 of the seat 300. In the stowed position (FIG. 5), the latch connector arms 130 are oriented such that their distal ends 133 are not engageable with the corresponding LATCH anchors 340 of the seat 300. As indicated by the arrows A of FIG. 4, each of the latch connector arms 130 may be rotated inwardly toward a central plane or central point of the car seat base 100 such that the latch connector arms 130 do not protrude laterally from the seat base body 110 in the stowed position. The latch connector arms 130 may be substantially L-shaped with the pivot axis 140 horizontally offset from the major axis 131, such that the distal end 133 is laterally offset from the pivot axis 140. As a result, the latch connector arms 130 may be rotated into the stowed position without interfering with the seat base body 110.

The pivot axis 140 of each latch connector arm 130 may extend substantially perpendicular or orthogonal to the major axis 131 and substantially perpendicular or orthogonal to the transverse horizontal axis H. In the stowed position, each latch connector arm 130 may be rotated approximately 180° about the pivot axis 140 relative to the attachment position. However, rotation of each latch connector arm 130 between the attachment position and the stowed position may be more or less than 180° so long as, in the stowed position, the latch connector arms 130 do not interfere with the path of the vehicle seat belt routed through the belt channel 120.

With continued reference to FIGS. 4 and 5, the seat base body 110 may include an upper member 112 and a lower member 113 rotatably connected to one another to permit height and angle adjustment of the car seat base 100. The upper member 112 and the lower member 113 may be connected, for example, via a pivot shaft 114, and an adjustment mechanism 150 may be used to lock the upper member 112 and the lower member 113 into a desired position relative to one another. The adjustment mechanism 150 may include a toothed slot 151 engageable with a rod 152 in a plurality of positions to define the angle and height at which the CRS 200 (see FIGS. 1-3) sits in the vehicle seat 300. Other arrangements facilitating height and angle adjustment of the car seat base 100 may also be utilized. In other aspects, the seat base body 110 may be a single integral member without height and angle adjustment capabilities.

A pin 160 may be inserted through the lower member 113 of the seat base body 110 adjacent to each of the latch connector arm 130. The pin 160 may abut a portion of the corresponding latch connector arm 130 to index and/or retain the latch connector arm 130 in the attachment position and/or the stowed position. In particular, the pin 160 may physically engage a portion of the latch connector arm 130 to prevent rotation out of the desired position. In order to change the latch connector arm 13 from the attachment position to the stowed position, or vice versa, the pin 160 may be removed, the latch connector arm 130 may be rotated to the desired position, and the pin 160 may be reinserted. In other aspects, the lower member 113 and/or the latch connector arms 130 may include cam mechanisms, detents, over-the-center springs, magnets, or like mechanical features to index and/or retain the latch connector arm 130 in the attachment position and/or the stowed position.

Having described the general structural features of the car seat base 100 according to an aspect of the present disclosure, attachment of the car seat base to the vehicle seat 300 will now be described. The belt channel 120 may be utilized in conjunction with the vehicle seat belt (not shown) to provide a first means for securing the car seat base 100 to the vehicle seat 300. In particular, a user may position the car seat base 100 onto the vehicle seat 300, insert the vehicle seat belt into the belt channel 120 on one side of the seat base body 110, pull the seat belt through the belt channel 120 to the opposite side of the seat base body 110, and secure the seat belt to a buckle (not shown) in or near the bight 330 of the seat 300. Tension generated by the seat belt acts toward the bight 330 of the seat 300, retaining the car seat base 100 against the back cushion 310 and/or the bottom cushion 320. When the seat belt is used to secure the car seat base to the seat 300, the latch connector arms 130 are typically positioned in the stowed position (FIG. 5) so that the latch connector arms 130 cannot engage the LATCH anchors 340 or otherwise interfere with positioning the car seat base 100 in the seat 300. Importantly, the latch connector arms 130 in the stowed position do not obstruct the path of the seat belt through the belt channel 120 or to the buckle of the seat 300. As such, the seat belt cannot inadvertently be caught or snagged on the latch connector arms 130 as the seat belt is routed through the belt channel 120 and to the buckle. Accordingly, the risk of under-tightening or over-tightening the seat belt is reduced.

Alternatively, the latch connector arms 130 may be attached to the LATCH anchors 340 to provide a second means for securing the car seat base 100 to the vehicle seat 300. In particular, a user may rotate the latch connector arms 130 to the attachment position (FIG. 4), position the car seat base 100 onto the vehicle seat 300, and attach the distal end 133 of each latch connector arm 130 to the corresponding LATCH anchor 340. The connection between the latch connector arms 130 and the LATCH anchors 340 retains the car seat base 100 against the vehicle seat 300.

While it is contemplated by the present disclosure that the vehicle seat belt and the latch connector arms 130 could be used together, most U.S. automobile and CRS manufacturers explicitly discourage this practice and, therefore, the car seat base 100 may be securely attached to the vehicle seat 300 using either the vehicle seat belt or the latch connector arms 130. Thus, when the vehicle seat belt is used in conjunction with the belt channel 120 to secure the car seat base 100 to the vehicle seat 300, the latch connector arms 130 may be rotated by the user to the stowed position (FIG. 5) in order to prevent interference between the vehicle seat belt and the latch connector arms 130. Conversely, when the latch connector arms 130 are used to secure the car seat base to the LATCH anchors 340, the vehicle seat belt is not utilized.

Figure 6:
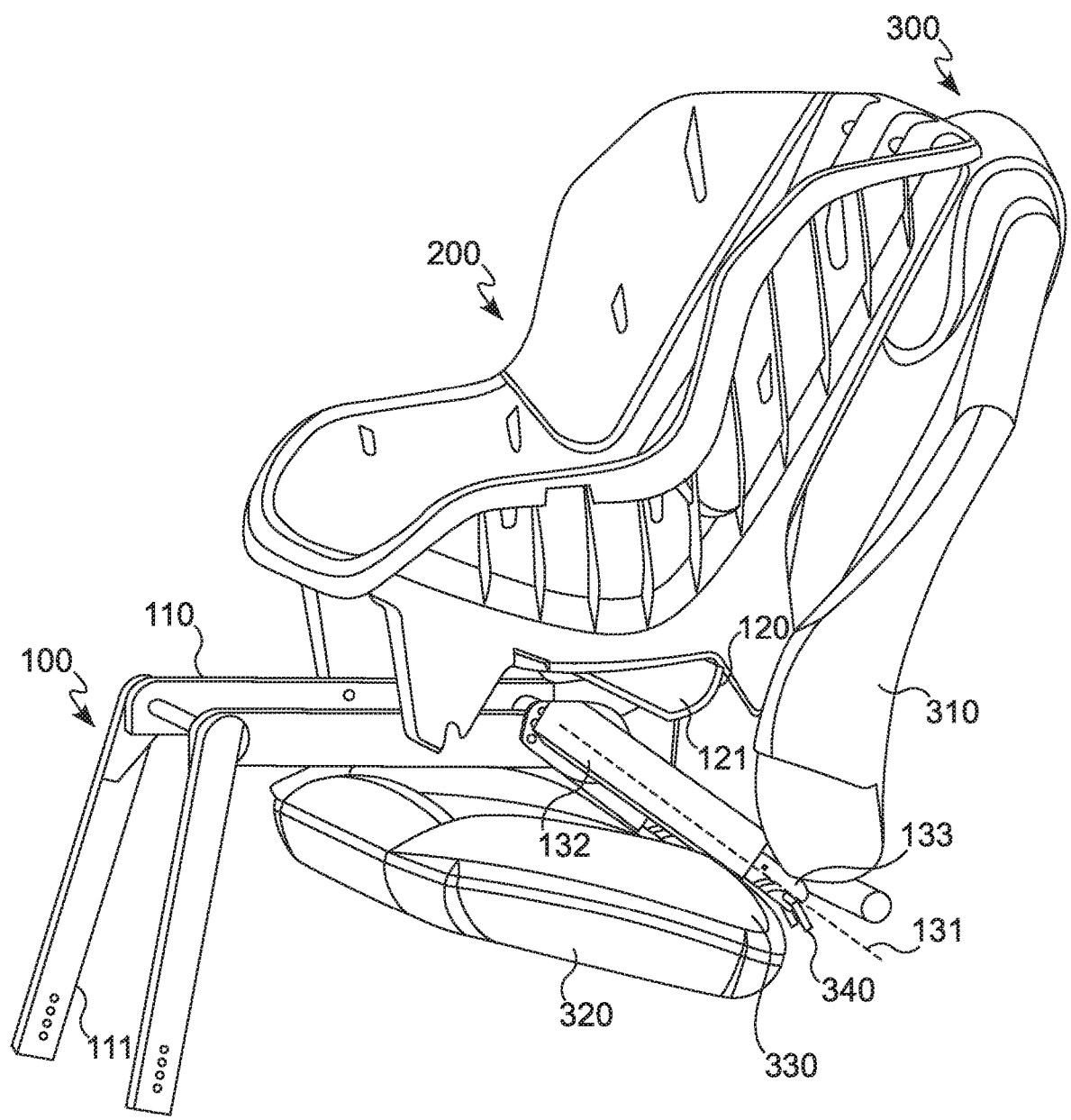
FIG. 6 is a perspective view of a child car seat base according to another aspect of the present disclosure.
Figure 7:
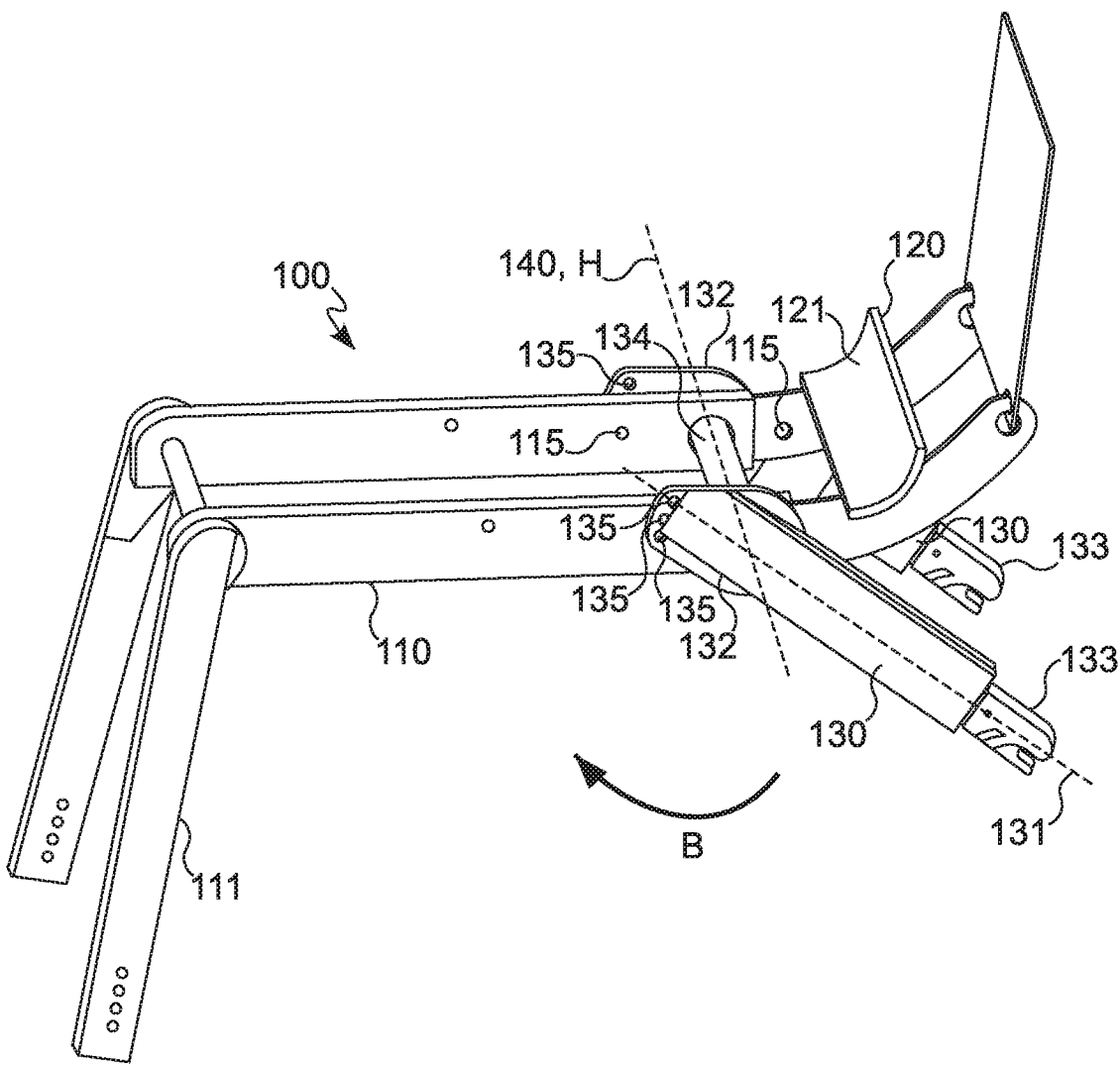
FIG. 7 is a perspective view of the child car seat base of FIG. 6, with latch arms in the attachment position.
Figure 8:
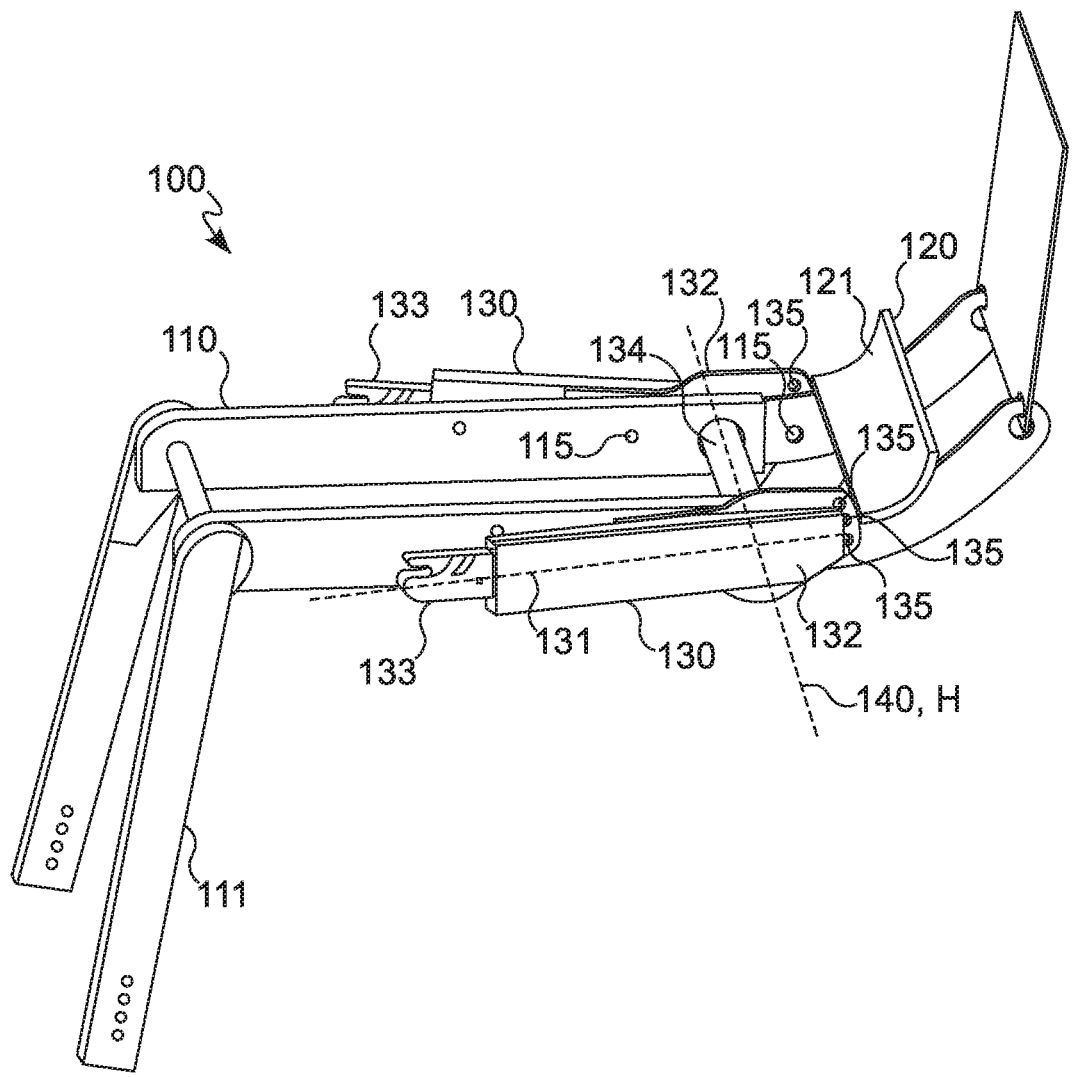
FIG. 8 is a rear perspective view of the child car seat base of FIG. 6, with the latch arms in the stowed position.

FIGS. 6-8 illustrate another aspect of the car seat base 100 of the present disclosure. Due to the similarities between the embodiment of FIGS. 1-5 and the embodiment of FIGS. 6-8, only the differences will be discussed in detail. The CRS 200 is shown as a front-facing child seat, but, as with the aspect of FIGS. 1-5, rear-facing infant seats and convertible child seats may also be utilized. The car seat base 100 depicted in FIGS. 6-8 is similar to the aspect of FIGS. 1-5, including the seat base body 110 and two latch connector arms 130 rotatably connected thereto. However, the pivot axis 140 about which each latch connector arm 130 rotates extends substantially parallel and/or coaxial with the transverse horizontal axis H. As such, the respective pivot axes 140 of the latch connector arms 130 may be coaxial such that the latch connector arms share an axis of rotation. The latch connector arms 130 may be rigidly attached to one another via a pivot shaft 134 extending along the pivot axis 140, such that the latch connector arms 130 may be pivoted by the user as a unit between the attachment position, shown in FIGS. 6 and 7, and the stowed position, shown in FIG. 8. As indicated by the arrow B of FIG. 7, the latch connector arms 130 may be rotated from the attachment position to the stowed position, and vice versa, by swinging the distal ends 133 along an arcuate path below the CRS 200.

The pivot axis 140 is located on the opposite side of the belt channel 120 relative to the back cushion 310 of the seat 300 such that, in the stowed position (FIG. 8), the latch connector arms 130 do not interfere with the routing of the seat belt through the belt channel 120 or the connection of the seat belt to the buckle. More particularly, in the stowed position, the latch connector arms 130 do not protrude laterally from the seat base body 110 in an area where the vehicle seat belt would extend out of the belt channel 120. As may be appreciated from FIG. 8, the latch connector arms 130 may be rotated to the stowed position such that the latch connector arms 130 extend substantially parallel with the seat base body 110. However, the latch connector arms 130 in the stowed position may be rotated short of parallel or beyond parallel relative to the seat base body 110 so long as the latch connector arms 130 do not interfere with the path of the vehicle seat belt routed through the belt channel 120.

Each of the latch connector arms 130 may include one or more apertures 135 which align with corresponding apertures 115 in the seat base body 110. One of the apertures 135 of each latch connecting arm 130 may correspond to the attachment position, and another of the apertures of each latch connecting arm 130 may correspond to the stowed position. A pin (not shown) may be inserted at least partially through the aperture 135 in the latch connector arms 130 corresponding to the attachment position and through the aperture 115 in the seat base body 110 to rotationally lock the latch connector arms 130 relative to the seat base body 110 in the attachment position. Similarly, the pin may be inserted at least partially through the aperture 135 in the latch connector arms 130 corresponding to the stowed position and through the aperture 115 in the seat base body 110 to rotationally lock the latch connector arms 130 relative to the seat base body 110 in the stowed position. In some aspects, the one or more apertures 135 of each latch connecting arm 130 may include multiple apertures corresponding to multiple attachment positions. The multiple attachment positions allow the latch connector arms 130 to be rotationally locked relative to the seat base body 110 in multiple orientations to accommodate for varying geometries of the vehicle seat 300 and/or the CRS 200.

Attachment of the car seat base 100 of FIGS. 6-8 to the vehicle seat 300 is substantially the same as attachment of the car seat base 100 of FIGS. 1-5. The belt channel 120 may be utilized in conjunction with the vehicle seat belt (not shown) to provide a first means for securing the car seat base 100 to the vehicle seat 300. In particular, a user may position the car seat base 100 onto the vehicle seat 300, insert the vehicle seat belt into the belt channel 120 on one side of the seat base body 110, pull the seat belt through the belt channel 120 to the opposite side of the seat base body 110, and secure the seat belt to a buckle (not shown) in or near the bight 330 of the seat 300. Tension generated by the seat belt acts toward the bight 330 of the seat 300, retaining the car seat base 100 against the back cushion 310 and/or the bottom cushion 320. When the seat belt is used to secure the car seat base to the seat 300, the latch connector arms 130 are typically folded by the user into the stowed position so that the latch connector arms 130 cannot engage the LATCH anchors 340 or otherwise interfere with positioning the car seat base 100 in the seat 300. Importantly, the latch connector arms 130 in the stowed position do not obstruct the path of the seat belt through the belt channel 120 or to the buckle of the seat 300. As such, the seat belt cannot inadvertently be caught or snagged on the latch connector arms 130 as the seat belt is routed through the belt channel 120 and to the buckle. Accordingly, the risk of under-tightening or over-tightening the seat belt is reduced.

Alternatively, the latch connector arms 130 may be attached to the LATCH anchors 340 to provide a second means for securing the car seat base 100 to the vehicle seat 300. In particular, a user may rotate the latch connector arms 130 to the attachment position, position the car seat base 100 onto the vehicle seat 300, and attach the distal end 133 of each latch connector arm 130 to the corresponding LATCH anchor 340. The connection between the latch connector arms 130 and the LATCH anchors 340 retains the car seat base 100 against the vehicle seat 300.

While it is contemplated by the present disclosure that the vehicle seat belt and the latch connector arms 130 could be used together, most U.S. automobile and CRS manufacturers explicitly discourage this practice and, therefore, the car seat base 100 may be securely attached to the vehicle seat 300 using either the vehicle seat belt or the latch connector arms 130. Thus, when the vehicle seat belt is used in conjunction with the belt guide 120 to secure the car seat base 100 to the vehicle seat 300, the latch connector arms 130 may be rotated by the user to the stowed position in order to prevent interference between the vehicle seat belt and the latch connector arms 130. Conversely, when the latch connector arms 130 are used to secure the car seat base to the LATCH anchors 340, the vehicle seat belt is not utilized.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements. For example, it is to be understood that the present invention contemplates that to the extent possible, one or more features of any embodiment can be combined with one or more features of any other embodiment.

The invention claimed is:

1. A base for a child car seat, comprising:
    a seat base body configured to support a child carrier, the seat base body having a belt channel configured to receive a vehicle seat belt to retain the seat base body against a vehicle seat; and
    a latch connector arm having a proximal end pivotally connected to the seat base body and a distal end configured to attach to a rigid anchor of the vehicle seat, the latch connector arm rotatable between a stowed position and an attachment position,
    wherein, in the stowed position, the latch connector arm is located such that the vehicle seat belt may extend through the belt channel and connect to a buckle of the vehicle seat without contacting the latch connector arm, and
    wherein the proximal end of the latch connector arm is pivotal about an orthogonal axis extending substantially perpendicular to a major axis of the latch connector arm.

2. The base for a child car seat of claim 1, wherein the seat base body comprises:
    an upper member;
    a lower member pivotally attached to the upper member; and
    a height adjustment mechanism configured to adjust the angle between the upper member and the lower member.

3. The base for a child car seat of claim 2, further comprising a pin extending through the lower member, wherein the pin is configured to abut the latch connector arm in at least one of the stowed position or the attachment position.

4. The base for a child car seat of claim 2, wherein the height adjustment mechanism comprises a toothed slot configured to engage a rod to lock the upper member to the lower member in any of a plurality of positions.

5. The base for a child car seat of claim 1, wherein the latch connector arm is pivotal about the orthogonal axis such that the distal end of the latch connector arm rotates inwardly towards a central plane of the base.

6. The base for a child car seat of claim 1, wherein the latch connector arm comprises:
    a first latch connector arm pivotal about a first orthogonal axis extending substantially perpendicular to a major axis of the first latch connector arm; and
    a second latch connector arm pivotal about a second orthogonal axis extending substantially perpendicular to a major axis of the second latch connector arm.

7. The base for a child car seat of claim 1, wherein the proximal end of the latch connector arm is located between the seat belt channel and a back cushion of the vehicle seat.

8. The base for a child car seat of claim 1, wherein the latch connector arm comprises an L-shaped member such that the orthogonal axis is horizontally offset from the major axis of the latch connector arm.

9. The base for a child car seat of claim 1, wherein the latch connector arm comprises a first latch connector arm rigidly attached to a second latch connector arm via a shaft.

10. The base for a child car seat of claim 1, wherein the latch connector arm defines at least one aperture, and
    wherein the latch connector arm is lockable in the attachment position by a pin extending at least partially through the seat base body and one of the at least one apertures.

11. The base for a child car seat of claim 10, wherein the latch connector arm is lockable in the stowed position by a pin extending at least partially through the seat base body and one of the at least one apertures.

12. The base for a child car seat of claim 1, further comprising a leg extending from the seat base body and configured to engage a floor surface to elevate at least a portion of the seat base body above the vehicle seat.

13. A base for a child car seat comprising:
    a seat base body configured to support a child carrier, the seat base body having a belt channel configured to receive a vehicle seat belt to retain the seat base body against a vehicle seat; and
    a latch connector arm having a proximal end pivotally connected to the seat base body and a distal end configured to attach to a rigid anchor of the vehicle seat, the latch connector arm rotatable between a stowed position and an attachment position,
    wherein, in the stowed position, the latch connector arm is located such that the vehicle seat belt may extend through the belt channel and connect to a buckle of the vehicle seat without contacting the latch connector arm, and
    wherein the proximal end of the latch connector arm is pivotal about a transverse axis extending in a substantially horizontal direction.

14. The base for a child car seat of claim 13, wherein the belt channel of the seat base body is located between the transverse axis and a back cushion of the vehicle seat.

15. A base for a child car seat, comprising:
    a seat base body configured to support a child carrier, the seat base body configured to be retained against a vehicle seat of a vehicle via a seat belt of the vehicle;
    a leg extending from the seat base body and configured to engage a floor surface of the vehicle to elevate at least a portion of the seat base body above the vehicle seat; and
    a latch connector arm having a proximal end pivotally connected to the seat base body and a distal end configured to attach to a rigid anchor of the vehicle seat, the latch connector arm rotatable between a stowed position and an attachment position,
    wherein the proximal end of the latch connector arm is pivotal about an orthogonal axis extending substantially perpendicular to a major axis of the latch connector arm.

16. The base for a child car seat of claim 15, wherein, in the stowed position, the latch connector arm is located such that the vehicle seat belt may extend through the seat base body and connect to a buckle of the vehicle seat without contacting the latch connector arm.

17. The base for a child car seat of claim 15, wherein the latch connector arm comprises an L-shaped member such that the orthogonal axis is horizontally offset from the major axis of the latch connector arm.

18. The base for a child car seat of claim 15, wherein the proximal end of the latch connector arm is pivotal about a transverse axis extending in a substantially horizontal direction.

\* \* \* \* \*

UNITED STATES PATENT AND TRADEMARK OFFICE
CERTIFICATE OF CORRECTION

| | |
|---|---|
| PATENT NO. | : 11,897,374 B2 |
| APPLICATION NO. | : 17/058994 |
| DATED | : February 13, 2024 |
| INVENTOR(S) | : Henry F. Thorne |

It is certified that error appears in the above-identified patent and that said Letters Patent is hereby corrected as shown below:

In the Specification

Column 1, Line 9, after "filed" delete "on"

In the Claims

Column 12, Line 28, Claim 13, delete "seat" and insert -- seat, --

Signed and Sealed this
Ninth Day of April, 2024

Katherine Kelly Vidal
*Director of the United States Patent and Trademark Office*